May 12, 1970     S. K. SMITH     3,511,137
COMPOSITE ARTICLE AND METHOD OF MANUFACTURE
Filed Aug. 13, 1968     2 Sheets-Sheet 1
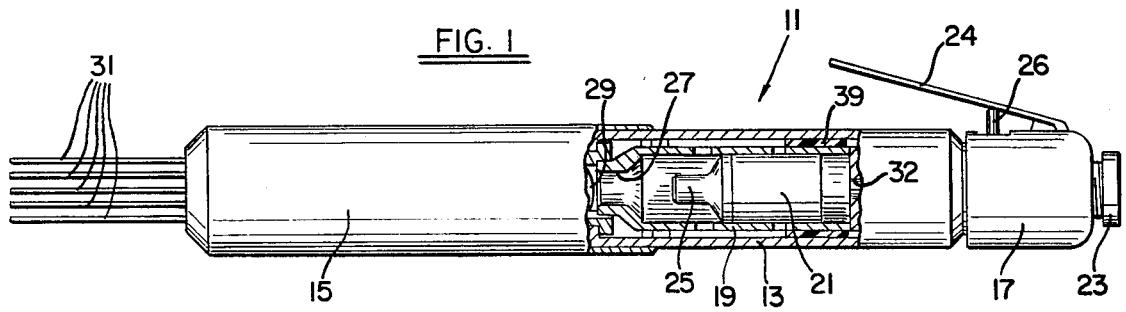
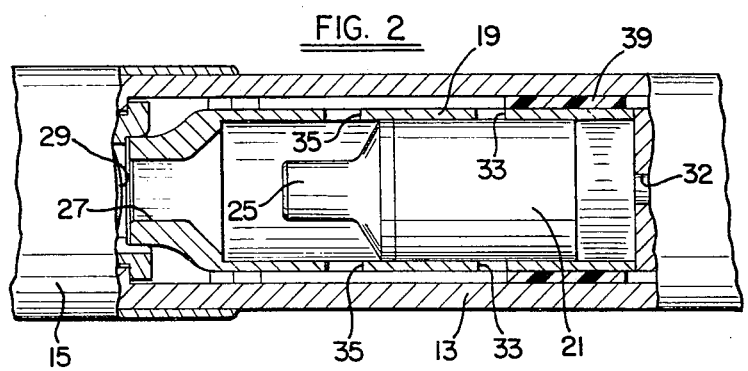
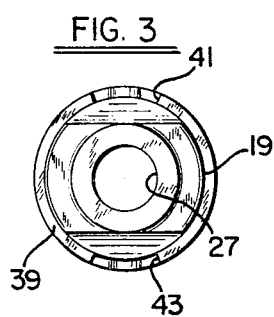
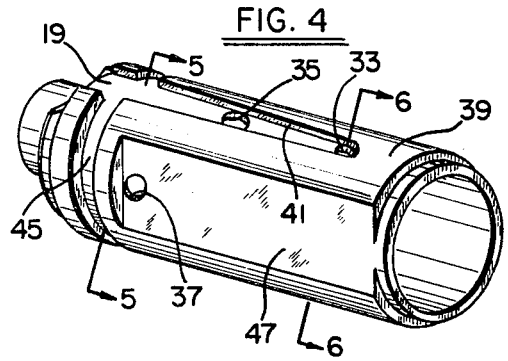
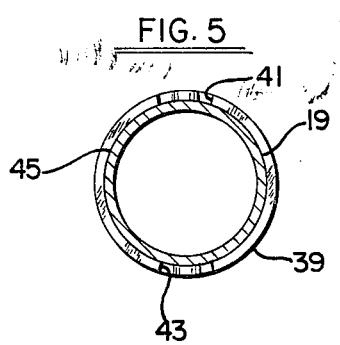
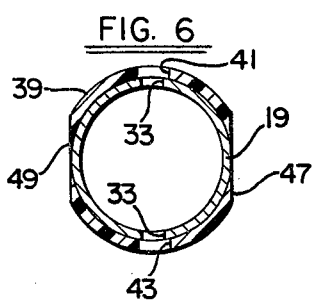
INVENTOR
STANLEY K. SMITH
BY *Joseph R. Slotnick*
ATTORNEY

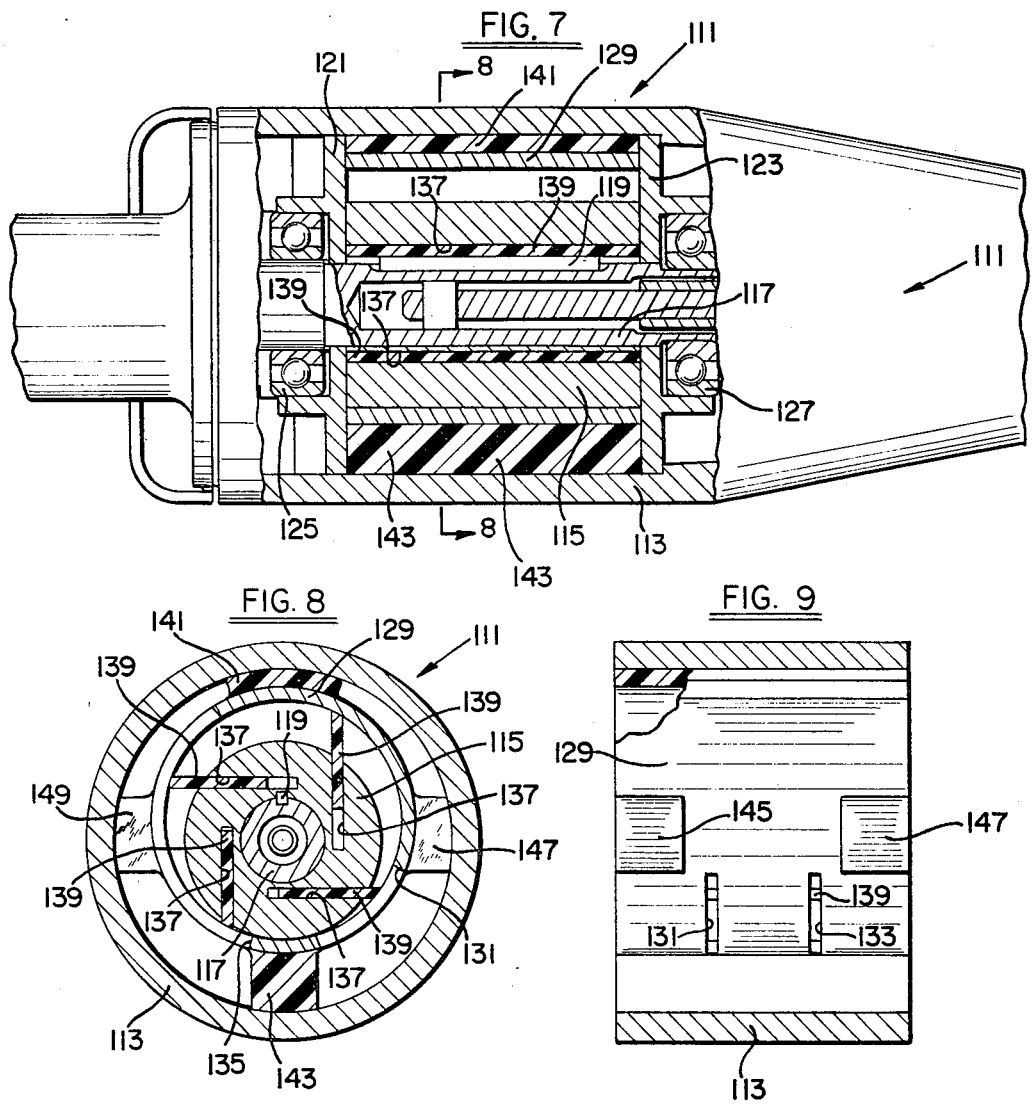

United States Patent Office 3,511,137
Patented May 12, 1970

3,511,137
COMPOSITE ARTICLE AND METHOD
OF MANUFACTURE
Stanley K. Smith, Baltimore, Md., assignor to The Black
and Decker Manufacturing Company, Towson, Md., a
corporation of Maryland
Filed Aug. 13, 1968, Ser. No. 752,305
Int. Cl. F01b 11/02; F21b 3/00; F16k 5/00
U.S. Cl. 92—171                                    7 Claims

ABSTRACT OF THE DISCLOSURE

There are disclosed herein fluid operated devices each of which includes a stationary cylinder within a casing and having a fluid operated member movably disposed therein. In one embodiment, the movable member is a reciprocal piston adapted to strike a tool bit while in the other, the movable member is a rotor having a plurality of vanes thereon. In both embodiments, fluid is delivered to and discharged from the cylinder by way of passages formed between the casing and cylinder.

SUMMARY OF THE INVENTION

The present invention relates to a novel composite article particularly adapted for use as a cylinder in a fluid pump, motor and the like. The article includes a first portion to provide desirable characteristics such as good heat dissipation, and a second portion molded thereon which readily provides a sealing fit in a casing and in which the required fluid passages can readily be formed. This construction eliminates the heretofore costly and time consuming machining required to provide the proper fit between the casing and cylinder and the fluid passages in the cylinder when the latter was made of metal. However, the cylinder portion retains the necessary heat dissipation and wear characteristics so that, overall, a construction is provided at a substantial cost savings.

Main objects of the present invention, therefore, are to provide a novel, composite article adapted for use, for example, as a fluid pump or motor cylinder, wherein the article satisfies different physical property and configuration requirements at different portions thereon and which, because of its composite nature, facilitates simple and relatively inexpensive fabrication.

Further and more specific objects of the present invention are to provide an improved article of the above character which, when employed as a fluid pump or motor cylinder, facilitates good heat dissipation, good wear characteristics, accurate assembly to a casing, and facilitates inexpensive and easy formation of fluid inlet and discharge passages.

Other objects and advantages of the present invention will become more apparent from a consideration of the detailed description to follow taken in conjunction with the drawings annexed hereto.

BRIEF DESCRIPTION OF THE DRAWINGS

FIG. 1 is a view, partly in section and partly in elevation, illustrating a pneumatic tool embodying a preferred form of the invention;
FIG. 2 is an enlarged view of a portion of FIG. 1;
FIG. 3 is an end view of the cylinder of FIGS. 1 and 2;
FIG. 4 is a perspective view of the structure of FIG. 3;
FIG. 5 is a sectional view of FIG. 4 taken along the line 5—5 thereof;
FIG. 6 is a sectional view of FIG. 4 taken along the line 6—6 thereof;
FIG. 7 is a fragmentary view, partly in section, illustrating a modified form of the invention employed in a different type of pneumatic device;
FIG. 8 is a sectional view of FIG. 7 taken along the line 8—8 thereof; and
FIG. 9 is a view partly in section and partly broken away showing the cylinder of FIGS. 7 and 8 mounted in place in the casing.

BROAD STATEMENT OF THE INVENTION

Broadly described, the present invention relates to a fluid operated device of the type which includes a stationary member having a generally cylindrical cavity, a member within said stationary member and movable relative thereto in response to the passage of fluid therethrough, port means in said stationary member allowing entry and discharge of fluid relative to said cavity to move said movable member, a casing encompassing said stationary member, and includes the improvement, in said motor, wherein said stationary member has means molded thereon having an outer surface generally complementary to the inner surface of said casing and sealingly engaged therewith, said molded means having interrupted areas which cooperate with said casing to define passageways allowing the flow of fluid between said stationary member and said casing, said passageways being in communication with said port means.

In another aspect, the present invention relates to a composite article comprising a first portion of relatively hard and stable material having good heat transfer properties, said first portion having a generally cylindrical cavity therein, port means through said first portion, a second portion of firm, pliable, moldable material molded on said first portion and having interrupted surface areas defining pasageway means which communicate with said port means.

In still another aspect, the present invention includes the method of making a composite article adapted for use as a cylinder liner in a fluid pump, motor and the like, said method comprising the steps of selecting a generally cylindrical member constructed of a relatively hard and stable material having port means therein, supporting said cylindrical member in a die cavity, and molding a firm, pliable material on said member to form passageway means which communicate with said port means.

DETAILED DESCRIPTION

Referring now more specifically to the drawings, a pneumatically operated needle scaler employing a pneumatic motor embodying the present invention is illustrated generally at 11 in FIG. 1. It is to be understood, however, that this invention applies to other devices which include generally fluid handling pumps, motors and the like and that the devices illustrated are exemplary only. With this in mind, the scaler 11 is seen to include a motor casing 13 having a bit casing 15 and a valve housing 17 connected to opposite ends thereof. A stationary liner or cylinder 19 is disposed within the motor casing 13 and has a piston 21 slidably disposed therein. The piston 21 is reciprocated longitudinally within the cylinder 19 under the force of pressurized air admitted through an inlet coupling 23 and through a valve mechanism (not shown) within the valve housing 17. A pivotal lever 24 engages a plunger 26 which when depressed opens the valve. The forward or left-hand end of the piston 21 is reduced in diameter, as shown at 25, and when moved toward the left, as seen in FIGS. 1 and 2, extends through an opening 27 in a reduced end of the cylinder 19 and strikes the rear end of a tool bit shank 29. A plurality of needles 31 are associated with the tool bit shank 29 and are vibrated in response to the hammering action in the shank 29 by the piston 21.

In use, air is admitted to the cylinder 19 through an axial port 32, after the lever 24 and plunger 26 are depressed, and causes the piston 21 to move toward the left, as seen in FIGS. 1 and 2. At this point, the piston 21 covers a pair of diametrically opposed ports 33 while another pair of ports 35 allows air in front of the piston 21 to escape between the casing 13 and cylinder 19 and forwardly into the bit casing 15. As the piston 21 continues moving toward the left, it covers both sets of ports 33, 35 so that the air in front of the piston 21 no longer can escape through the ports 35. Momentum carries the piston 21 forwardly so that its end 25 strikes the tool bit shank 29 causing the needles 31 to perform their scaling task and the piston 21 to rebound. In the meantime, air pressure in the cylinder 19 in front of the piston 21 has built up and, through another set of ports 37 which are oriented 90° relative to the ports 35 and are disposed forwardly thereof, reacts on the valve causing it to close the port 32 and now deliver air pressure around the cylinder 19 to the ports 37. This drives the piston 21 rearwardly or toward the right until the ports 33 are covered at which time pressure build up behind the piston 21 again reverses the valve and the sequence is repeated.

It will be appreciated that several passageways are required to communicate the ports 33, 35 to atmosphere and the ports 37 to the valve. In the past, these passageways were formed in the cylinder 19 which generally was formed of metal for good motor characteristics and heat dissipation. This required that the cylinder be milled and ground, a process which is costly and time consuming and contributed significantly to the overall cost of the device.

In addition, proper motor operation requires a sealing fit between the cylinder 19 and the motor casing 13. Again, the all metal cylinder 19 required accurate and costly finish machining to achieve this end, and, when pressed in place in the casing, was virtually impossible to remove for servicing.

The present invention obviates these problems and provides a considerably less expensive cylinder construction which satisfies all the physical property requirements. Thus, as seen in FIGS. 3-6, the cylinder 19, which is formed of a relatively hard and stable material having good heat transfer characteristics, for example, steel, has moldable, firm, pliable material 39 provided on its outer surface. This material 39 may be selected from the group consisting of thermoplastic plastics, thermosetting plastics and rubber. Specific examples of materials found to be satisfactory here are the polyurethanes, polyesters, polyvinyls and polychlorides. In any event, this material is preferably molded directly on the cylinder 19 and is formed with interruptions 41, 43, 45, 47, 49. This may be done conveniently by supporting the cylinder 19 within a molding die having projections complementary to the interruptions 41, 43, 45, 47, 49 and thereafter molding the material 39 to this configuration. The remainder or uninterrupted portion of the material 39 is dimensioned complementary to the other parts of the molding die and snugly fits in the motor casing 13 so that the interruptions 41, 43, 45, 47, 49 form passageways which communicate with the ports 33, 35, 37 for handling delivery and discharge of air to and from the cylinder 19. Conveniently, the ports 33, 35, 37 may be formed in the cylinder 19 before molding the material 39 thereon and may be used to locate the cylinder 19 within the molding die.

It will be appreciated that it is considerably easier to provide a sealing fit between the molded material 39 formed on the cylinder 19 and the motor casing 13 than it is to form the same between an all steel cylinder 19 and the casing 13, as was done in the past. The molded material 39 is relatively softer than steel and is easier to grind to dimension and may be pressed into the casing 13 with relative ease after dipping in oil. In addition, the nature of this material 39 allows the cylinder 19 to be removed from the casing 13 with relative ease to facilitate servicing of the motor parts. Furthermore, the interrupted portions 41, 43, 45, 47, 49 are formed in the material 39 during the molding process so that the corresponding required passageways are formed without any extra machining. All in all, no quality is sacrificed while the cost is substantially reduced.

A modified form of the invention is illustrated in FIGS. 7-9. Here, a pneumatic motor of the rotor vane type is illustrated generally at 111 and is seen to include a motor casing 113 having the motor disposed therein. The motor includes a rotor body 115 secured to a shaft 117 by a key 119 for rotation therewith. A pair of end plates 121, 123 are secured within the casing 113 on either side of the rotor 115 and carry bearings 125, 127 which rotatably support the shaft 117. A stationary liner or cylinder 129 surrounds the rotor 115 in eccentric fashion and is provided with inlet ports 131, 133 and an exhaust port 135. The rotor 115 is provided with a plurality of axially extending slots 137 each of which has a vane 139 slidably disposed therein.

In use, pressurized air is delivered to the casing 113 through inlet means (not shown) and enters the cylinder 129 through the inlet ports 131, 133. This air bears against the vanes 139 and causes the rotor 115 and shaft 117 to turn. Centrifugal force on the vanes 139 holds them in engagement with the cylinder 129 and air exhausts through the port 135.

As was the case in the embodiment of FIGS. 1-6, it is necessary for proper motor operation to provide a sealing fit between the cylinder 129 and the casing 113. In addition, it is desirable that as much of the cylinder 129 as possible be exposed for good heat dissipation during motor operation. In the past, the outer surface of the cylinder 129 needed to be accurately machined to fit snugly in the casing 113, a process which was expensive and time consuming. In addition, accurate passageways were required to be formed between the liner 129 and the casing 113 for inlet and exhaust of air which also contributed significantly to the overall cost of the device.

In this form of the present invention, the cylinder 129, which preferably is formed of a relatively hard and stable material having good heat transfer characteristics, for example, steel, has a plurality of ribs of soft and pliable but firm, moldable, material molded directly thereon. The examples given above for the material 39 are equally applicable here. Two such ribs, illustrated at 141, 143, extend the full length of the cylinder 129 between the end plates 121, 123 and are pressed into the casing 113 so as to provide a seal between the inlet and exhaust ports 131, 133 and 135.

Other ribs 145, 147 are provided on the cylinder 129 adjacent the inlet ports 131, 133 to support the cylinder 129 at this area. These ribs 145, 147 do not extend the full length of the cylinder 129 and therefore allow air circulation at this area for good heat dissipation. Two similar ribs 149 (only one of which is shown) are disposed on the other side of the liner 129 to support it in this area. Like the ribs 145, 147, the ribs 149 are not continuous and allow free air circulation for good heat dissipation.

Like the embodiment of FIGS. 1-6, this embodiment requires considerably less effort (and cost) to provide the proper support and sealing arrangement between the cylinder 129 and the casing 113, than in the past, thereby significantly reducing the overall cost of the device.

By the foregoing, there has been disclosed a novel composite article and method of manufacture thereof calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. In a fluid operated device of the type which includes a stationary member having a generally cylindrical cavity, a member within said stationary member and movable relative thereto in response to the passage of fluid therethrough, port means in said stationary member allowing entry and discharge of fluid relative to said cavity to move said movable member, a casing encompassing said stationary member; the improvement, in said device, wherein said stationary member has means molded thereon having an outer surface generally complementary to the inner surface of said casing and sealingly engaged therewith, said molded means having interrupted areas which cooperate with said casing to define passageways allowing the flow of fluid between said stationary member and said casing, said passageways being in communication with said port means.

2. The improvement of claim 1 wherein said molded means comprises material selected from the group consisting of thermoplastic plastics, thermosetting plastics and rubber.

3. The improvement of claim 1 wherein said stationary member is constructed of a relatively hard and stable material having good heat transfer characteristics and said molded means is constructed of firm, pliable material.

4. The improvement of claim 1 wherein said device is a motor, said movable and stationary members comprising a piston and cylinder, respectively.

5. The improvement of claim 1 wherein said device is a motor, said movable and stationary members comprising a rotor and liner, respectively.

6. The improvement of claim 1 wherein said molded means comprises material selected from the group consisting of polyurethanes, polyesters, polyvinyls and polychlorides.

7. The improvement of claim 3 wherein said stationary member is metallic and said molded means is nonmetallic.

References Cited

UNITED STATES PATENTS

| | | | |
|---|---|---|---|
| 924,350 | 6/1909 | Hibschle | 92—171 |
| 2,925,089 | 2/1960 | Conklin et al. | 251—324 XR |
| 3,134,305 | 5/1964 | Jensen | 92—169 |
| 3,255,832 | 6/1966 | Leavell | 173—162 XR |
| 3,332,504 | 7/1967 | Lowery | 173—162 |
| 3,353,785 | 11/1967 | Eggers | 251—314 XR |

MARTIN P. SCHWADRON, Primary Examiner

L. J. PAYNE, Assistant Examiner

U.S. Cl. X.R.

92—146, 161; 173—162; 251—314, 324